(12) United States Patent
Ii (10) Patent No.: US 11,069,477 B2
(45) Date of Patent: Jul. 20, 2021

(54) COIL UNIT, WIRELESS POWER TRANSMISSION DEVICE, WIRELESS POWER RECEIVING DEVICE, AND WIRELESS POWER TRANSMISSION SYSTEM

(71) Applicant: TDK CORPORATION, Tokyo (JP)

(72) Inventor: Akihiro Ii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/806,270

(22) Filed: Mar. 2, 2020

(65) Prior Publication Data

US 2020/0286680 A1    Sep. 10, 2020

(30) Foreign Application Priority Data

Mar. 7, 2019    (JP) .............................. JP2019-041800

(51) Int. Cl.

| | |
|---|---|
| *H01F 38/14* | (2006.01) |
| *H02J 50/70* | (2016.01) |
| *H04B 5/00* | (2006.01) |
| *H02J 50/12* | (2016.01) |
| *H02J 7/00* | (2006.01) |
| *H02J 50/90* | (2016.01) |

(52) U.S. Cl.
CPC ............ *H01F 38/14* (2013.01); *H02J 7/0042* (2013.01); *H02J 50/12* (2016.02); *H02J 50/70* (2016.02); *H02J 50/90* (2016.02); *H04B 5/0037* (2013.01)

(58) Field of Classification Search
None
See application file for complete search history.

(56) References Cited

U.S. PATENT DOCUMENTS

| 7,519,328 | B2* | 4/2009 | Dokai | G06K 19/07749 |
| | | | | 455/41.2 |
| 9,354,422 | B1* | 5/2016 | Quakenbush | H02K 41/035 |
| 2010/0301532 | A1* | 12/2010 | Cardone | B23Q 3/154 |
| | | | | 269/8 |
| 2012/0001714 | A1* | 1/2012 | Shin | H01F 27/325 |
| | | | | 336/198 |
| 2014/0306654 | A1* | 10/2014 | Partovi | H02J 50/12 |
| | | | | 320/108 |

(Continued)

FOREIGN PATENT DOCUMENTS

JP    2017-130491 A    7/2017

*Primary Examiner* — Lincoln D Donovan
*Assistant Examiner* — Khareem E Almo
(74) *Attorney, Agent, or Firm* — Oliff PLC (57) ABSTRACT

A coil unit capable of inhibiting overheating in a magnetic body while the amount of the magnetic body used is reduced includes a magnetic body and a coil with an opening, the magnetic body overlaps the coil in a first direction and includes first, second, and third areas, the first area includes first and second faces, the second area includes third and fourth faces, the third area includes fifth and sixth faces, a first distance between the fifth face and the coil is shorter than a second distance between the second face and the coil and is longer than a third distance between the first face and the coil, a fourth distance between the third face and the coil is shorter than the first distance, and a fifth distance between the fourth face and the coil is longer than the third distance.

21 Claims, 8 Drawing Sheets

(56) References Cited

U.S. PATENT DOCUMENTS

| | | | |
|---|---|---|---|
| 2015/0001953 A1* | 1/2015 | Fukuzawa | H01F 38/14 |
| | | | 307/104 |
| 2017/0178802 A1* | 6/2017 | Yang | H02J 50/10 |
| 2020/0020478 A1* | 1/2020 | Nishimura | H01F 27/2876 |
| 2020/0286680 A1* | 9/2020 | Ii | H02J 7/02 |
| 2020/0321806 A1* | 10/2020 | Sherman | H02J 50/12 |

* cited by examiner

COIL UNIT, WIRELESS POWER TRANSMISSION DEVICE, WIRELESS POWER RECEIVING DEVICE, AND WIRELESS POWER TRANSMISSION SYSTEM

BACKGROUND OF THE INVENTION

Field of the Invention

The present invention relates to a coil unit, a wireless power transmission device, a wireless power receiving device, and a wireless power transmission system.

Priority is claimed on Japanese Patent Application No. 2019-041800, filed Mar. 7, 2019, the content of which is incorporated herein by reference.

Description of Related Art

Technologies relating to wireless power transmission systems have been researched and developed. A wireless power transmission system performs wireless power transmission between a wireless power transmission device including a power transmission coil and a wireless power receiving device including a power receiving coil. Here, wireless power transmission is wireless transmission of electric power.

Here, in a case in which a power transmission coil and a power receiving coil are respectively disposed above magnetic bodies, characteristics of the power transmission coil and the power receiving coil are improved. For example, in such a case, the inductance of each of the power transmission coil and the power receiving coil is improved. In such a case, since magnetic flux passes through the inside of a magnetic body having lower magnetic resistance than that air, magnetic flux not contributing to wireless power transmission between a wireless power transmission device including a power transmission coil and a wireless power receiving device including a power receiving coil becomes small. For this reason, magnetic coupling between the power transmission coil and the power receiving coil in the wireless power transmission is improved.

However, in a case in which a power transmission coil is disposed above a magnetic body, a coil unit including the power transmission coil becomes heavier by an amount corresponding to the magnetic body. In addition, in a case in which a power receiving coil is disposed above a magnetic body, a coil unit including the power receiving coil becomes heavier by an amount corresponding to the magnetic body. For this reason, it is preferable that the used amount of a magnetic body in which each of the power transmission coil and the power receiving coil is disposed be kept to a necessary minimum.

In relation with this, a power receiver including a secondary resonance coil that receives electric power according to magnetic field resonance or electric field resonance from a primary resonance coil and a magnetic sheet that is disposed adjacent to the secondary resonance coil in a direction in which an axis of the secondary resonance coil extends and has a first thickness of a first area corresponding to the secondary resonance coil being larger than a second thickness of a second area not corresponding to the secondary resonance coil in a diagonal direction of the secondary resonance coil with respect to the axis is known (see Patent Document 1).

PATENT DOCUMENTS

[Patent Document 1] Japanese Unexamined Patent Application, First Publication No. 2017-130491

SUMMARY OF THE INVENTION

However, in such a magnetic sheet, magnetic flux passing through the inside of the magnetic sheet is concentrated on a shortest path among paths in which the magnetic flux passes through the inside of the magnetic sheet. For this reason, there are cases in which the magnetic sheet reaches an overheated state.

The present invention is realized with such situations taken into account, and an object thereof is to provide a coil unit, a wireless power transmission device, a wireless power receiving device, and a wireless power transmission system capable of inhibiting a magnetic body from reaching an overheated state while the amount of a magnetic body used is reduced.

According to one aspect of the present invention, there is provided a coil unit including: a magnetic body; and a coil made of a conductor in a spiral pattern disposed above the magnetic body, an opening is formed in the coil, the magnetic body overlaps the coil in a first direction and includes a first area including a part overlapping the conductor in the first direction, a second area positioned at a position farther from a center of the coil than the first area in a direction from the center of the coil toward an outer periphery side of the coil, and a third area positioned at a position closer to the center of the coil than the first area in the direction from the center of the coil toward the outer periphery side of the coil, the first area includes a first face and a second face, the first face is a face that overlaps the second face in the first direction and is closer to the coil than the second face in the first direction, the second area includes a third face and a fourth face, the third face is a face that overlaps the fourth face in the first direction and is closer to the coil than the fourth face in the first direction, the third area includes a fifth face and a sixth face, the fifth face is a face that overlaps the sixth face in the first direction and is closer to the coil than the sixth face in the first direction, a first distance between the fifth face and the coil among distances in the first direction is shorter than a second distance between the second face and the coil among the distances in the first direction and is longer than a third distance between the first face and the coil among the distances in the first direction, and a fourth distance between the third face and the coil among the distances in the first direction is shorter than the first distance, and a fifth distance between the fourth face and the coil among the distances in the first direction is longer than the third distance.

According to the present invention, a magnetic body can be inhibited from reaching an overheated state while the amount of a magnetic body used is reduced.

DETAILED DESCRIPTION OF THE INVENTION

Embodiment

Hereinafter, an embodiment of the present invention will be described with reference to the drawings. Here, in this embodiment, for the convenience of description, transmission of electric power through wireless transmission will be referred to as wireless power transmission. In this embodiment, a conductor transmitting an electrical signal according to DC power or an electrical signal according AC power will be referred to as a transmission line in description. For example, the transmission line is a conductor printed on a board. The transmission line may be a conductive wire that is a linearly-formed conductor or the like instead of the conductor.

<Overview of Wireless Power Transmission System>

Figure 1:
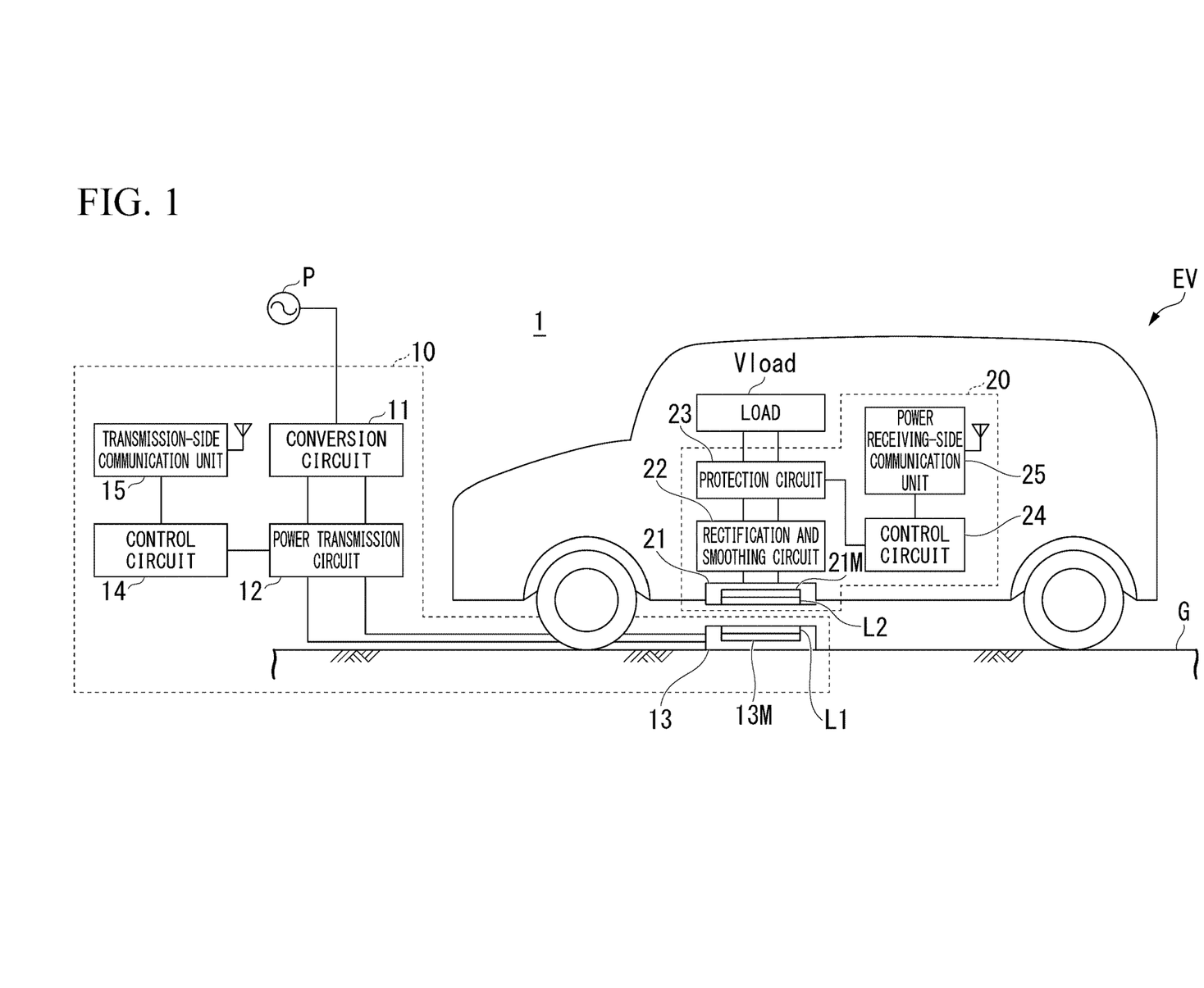
FIG. 1 is a diagram illustrating an example of the configuration of a wireless power transmission system 1 according to an embodiment.

First, an overview of a wireless power transmission system 1 according to an embodiment will be described. FIG. 1 is a diagram illustrating an example of the configuration of the wireless power transmission system 1 according to an embodiment.

The wireless power transmission system 1 includes a wireless power transmission device 10 and a wireless power receiving device 20.

In the wireless power transmission system 1, electric power is transmitted from the wireless power transmission device 10 to the wireless power receiving device 20 through wireless power transmission. More specifically, in the wireless power transmission system 1, electric power is transmitted from a power transmission coil L1 included in the wireless power transmission device 10 to a power receiving coil L2 included in the wireless power receiving device 20 through wireless power transmission. The wireless power transmission system 1, for example, performs wireless power transmission using a magnetic field resonance system. Instead of the magnetic field resonance system, the wireless power transmission system 1 may be configured to perform wireless power transmission using another system.

Hereinafter, as an example, a case in which the wireless power transmission system 1, as illustrated in FIG. 1, is applied to a system charging using wireless power transmission for a battery (a secondary battery) mounted in an electric vehicle EV will be described. The electric vehicle EV is a motor-driven vehicle (moving body) that travels by driving a motor using electric power charged into a battery. In the example illustrated in FIG. 1, the wireless power transmission system 1 includes the wireless power transmission device 10 that is installed on the ground surface G of a charging facility side and the wireless power receiving device 20 that is mounted in the electric vehicle EV. Instead of the configuration applied to the wireless power transmission system 1, the wireless power transmission system 1 may have a configuration which is applied to another device, another system, and the like.

Here, in wireless power transmission using a magnetic field resonance system, the wireless power transmission system 1 causes a resonance frequency of a power transmission-side resonance circuit (included in a power transmission coil unit 13 to be described below in the example illustrated in FIG. 1), which is not illustrated in the drawing, included in the wireless power transmission device 10 and a resonance frequency of a power-receiving side resonance circuit (included in a power receiving coil unit 21 to be described below in the example illustrated in FIG. 1), which is not illustrated in the drawing, included in the wireless power receiving device 20 to approach each other (or the resonance frequencies to coincide with each other), applies a current and a voltage of a high frequency near the resonance frequencies to the power transmission coil unit 13, and wirelessly transmits (supplies) electric power to the power receiving coil unit 21 that has been electronically resonated.

For this reason, the wireless power transmission system 1 according to this embodiment can charge a battery mounted in the electric vehicle EV using wireless power transmission while wirelessly transmitting electric power supplied from a charging facility side to the electric vehicle EV without performing connection to a charging cable.

<Configuration of Wireless Power Transmission System>

Hereinafter, the configuration of the wireless power transmission system 1 will be described with reference to FIG. 1.

The wireless power transmission device 10 includes a conversion circuit 11, a power transmission circuit 12, a power transmission coil unit 13, a control circuit 14, and a transmission-side communication unit 15. Meanwhile, the wireless power receiving device 20 includes a power receiving coil unit 21, a rectification and smoothing circuit 22, a protection circuit 23, a control circuit 24, and a power receiving-side communication unit 25. The wireless power receiving device 20 can be connected to a load Vload. In the example illustrated in FIG. 1, the wireless power receiving device 20 is connected to the load Vload. The wireless power receiving device 20 may be configured to include the load Vload.

The conversion circuit 11, for example, is an AC (Alternating Current)/DC (Direct Current) converter that is connected to an external commercial power supply P and converts an AC voltage input from the commercial power supply P into a desired DC voltage. The conversion circuit 11 is connected to the power transmission circuit 12. The conversion circuit 11 supplies the DC voltage acquired through conversion of the AC voltage to the power transmission circuit 12.

The conversion circuit 11 may be any circuit as long as it outputs a DC voltage to the power transmission circuit 12. For example, the conversion circuit 11 may be a conversion circuit acquired by combining a rectification and smoothing circuit that converts an AC voltage into a DC voltage through rectification and a PFC (Power Factor Correction) circuit performing power factor improvement, a conversion circuit acquired by combining a rectification and smoothing circuit and a switching circuit such as a switching converter, or any other conversion circuit that outputs a DC voltage to the power transmission circuit 12.

The power transmission circuit 12 converts a DC voltage supplied from the conversion circuit 11 into an AC voltage.

For example, the power transmission circuit 12 includes an inverter that is configured by a switching circuit in which a plurality of switching devices are connected in a bridge pattern. The power transmission circuit 12 is connected to the power transmission coil unit 13. The power transmission circuit 12 supplies an AC voltage of which a drive frequency is controlled on the basis of a resonance frequency of the power transmission-side resonance circuit included in the power transmission coil unit 13 to the power transmission coil unit 13.

For example, the power transmission coil unit 13 includes an LC resonance circuit including a capacitor not illustrated in FIG. 1 together with the power transmission coil L1 as a power transmission-side resonance circuit. In this case, the power transmission coil unit 13 can adjust the resonance frequency of the power transmission-side resonance circuit by adjusting the static capacitance of the capacitor. The wireless power transmission device 10 causes the resonance frequency of the power transmission-side resonance circuit to approach (or match) the resonance frequency of the receiving-side resonance circuit included in the power receiving coil unit 21 and performs wireless power transmission of a magnetic field resonance system. For example, the capacitor may be configured by a capacitor connected to the power transmission coil L1 in series, may be configured by a capacitor connected to the power transmission coil L1 in series and a capacitor connected to the power transmission coil L1 in parallel, or may be configured using another aspect. Hereinafter, a case in which the capacitor is a capacitor connected to the power transmission coil L1 in series will be described as an example. The power transmission coil unit 13 may be configured to include another resonance circuit including the power transmission coil L1 as a power transmission-side resonance circuit instead of the LC resonance circuit. In addition, the power transmission coil unit 13 may be configured to include another circuit, another circuit device, and the like in addition to the power transmission-side resonance circuit. Furthermore, the power transmission coil unit 13 may be configured to include an electromagnetic shield body (for example, a metal plate or the like) inhibiting leakage of a magnetic field generated by the power transmission coil L1 to the outside and the like.

In addition, the power transmission coil unit 13 includes a magnetic body 13M increasing magnetic coupling between the power transmission coil L1 and the power receiving coil L2. In the power transmission coil unit 13, the power transmission coil L1 is disposed above the magnetic body 13M. The configuration of the magnetic body 13M will be described below.

The power transmission coil L1, for example, is a wireless power transmission coil acquired by winding a Litz wire formed using copper, aluminum, or the like as a conductor in a spiral pattern. In this embodiment, the power transmission coil L1 is a wireless power transmission coil made of a conductor in a spiral pattern disposed above the magnetic body 13M. The power transmission coil L1 disposed above the magnetic body 13M is installed on the ground surface G or buried in the ground surface G together with the magnetic body 13M such that it faces a lower side of a floor of the electric vehicle EV. Hereinafter, a case in which the power transmission coil L1 (in other words, the power transmission coil unit 13) disposed above the magnetic body 13M is installed on the ground surface G together with the power transmission circuit 12 will be described as an example.

The control circuit 14 controls the wireless power transmission device 10. The control circuit 14 transmits/receives various kinds of information to/from the wireless power receiving device 20 by controlling the transmission-side communication unit 15. For example, the control circuit 14 receives power information representing electric power received by the wireless power receiving device 20 from the wireless power receiving device 20 using the transmission-side communication unit 15.

In addition, the control circuit 14 controls an AC voltage supplied to the power transmission coil L1 by the power transmission circuit 12 on the basis of power information received from the wireless power receiving device 20 through the transmission-side communication unit 15. More specifically, the control circuit 14 calculates an amount of transmission power to be transmitted to the wireless power receiving device 20 in accordance with the power information. The control circuit 14 controls a drive frequency of an inverter included in the power transmission circuit 12, a duty ratio of the inverter, and the like in accordance with the calculated amount of transmission power. In accordance with this, the control circuit 14 controls an AC voltage supplied to the power transmission coil L1 by the power transmission circuit 12. In other words, the control circuit 14 adjusts an AC voltage supplied to the power transmission coil L1 by the power transmission circuit 12 through feedback control based on power information. The control circuit 14, for example, performs PID control as feedback control for adjusting the AC voltage. The control circuit 14 may be configured to perform control other than the PID control as the feedback control for adjusting the AC voltage.

The transmission-side communication unit 15, for example, is a communication circuit (or a communication device) performing wireless communication according to a communication standard such as Wi-Fi (a registered trademark). The transmission-side communication unit 15 transmits/receives various kinds of information to/from the wireless power receiving device 20 in accordance with a signal from the control circuit 14.

The power receiving coil unit 21, for example, includes an LC resonance circuit including a capacitor not illustrated in FIG. 1 together with the power receiving coil L2 as a receiving-side resonance circuit. In this case, the power receiving coil unit 21 can adjust a resonance frequency of the receiving-side resonance circuit by adjusting the static capacitance of the capacitor. By causing the resonance frequency of the receiving-side resonance circuit to approach the resonance frequency of the power transmission-side resonance circuit (including a case in which the resonance frequencies are caused to coincide with each other), the wireless power receiving device 20 performs wireless power transmission of the magnetic field resonance system. The capacitor, for example, may be configured by a capacitor connected to the power receiving coil L2 in series, may be configured by a capacitor connected to the power receiving coil L2 in series and a capacitor connected to the power receiving coil L2 in parallel, or may be configured in accordance with another aspect. Hereinafter, a case in which the capacitor is a capacitor connected to the power receiving coil L2 in series will be described as an example. The power receiving coil unit 21 may be configured to include another resonance circuit including the power receiving coil L2 as the receiving-side resonance circuit instead of the LC resonance circuit. The power receiving coil unit 21 may be configured to include another circuit, another circuit device, and the like in addition to the receiving-side resonance circuit. The power receiving coil unit 21 may be configured to include an electromagnetic shield body inhibiting leakage of a magnetic field generated by the power receiving coil L2 to the outside and the like.

In addition, the power receiving coil unit 21 includes a magnetic body 21M increasing magnetic coupling between the power transmission coil L1 and the power receiving coil L2. In the power receiving coil unit 21, the power receiving coil L2 is disposed above the magnetic body 21M. The configuration of the magnetic body 21M will be described below.

The power receiving coil L2, for example, is a wireless power transmission coil acquired by winding a Litz wire formed using copper, aluminum, or the like as a conductor in a spiral pattern. In this embodiment, the power receiving coil L2 is a wireless power receiving coil made of a conductor in a spiral pattern disposed above the magnetic body 21M.

The rectification and smoothing circuit 22 is connected to the power receiving coil unit 21 and converts an AC voltage supplied from the power receiving coil L2 into a DC voltage through rectification. The rectification and smoothing circuit 22 can be connected to the load Vload. In the example illustrated in FIG. 1, the rectification and smoothing circuit 22 is connected to the load Vload through the protection circuit 23. In a case in which the rectification and smoothing circuit 22 is connected to the load Vload, the rectification and smoothing circuit 22 supplies a converted DC power to the load Vload. In the wireless power receiving device 20, in the case of being connected to the load Vload, the rectification and smoothing circuit 22 may be configured to be connected to the load Vload through a charging circuit instead of the protection circuit 23 or may be configured to be connected to the load Vload through a charging circuit in addition to the protection circuit 23.

Here, in a case in which the load Vload is connected to the rectification and smoothing circuit 22, the load Vload is supplied a DC voltage from the rectification and smoothing circuit 22. For example, the load Vload is a battery mounted in the electric vehicle EV described above, a motor mounted in the electric vehicle EV, or the like. The load Vload is a resistance load of which an equivalent resistance value changes with respect to time in accordance with a demand state (a storage state or a consumption state) of electric power. In the wireless power receiving device 20, the load Vload may be another load that is supplied a DC voltage supplied from the rectification and smoothing circuit 22 instead of a battery, a motor, or the like.

In a case in which the state of the wireless power receiving device 20 becomes a state (for example, an overvoltage state) in which a voltage or a current of an unintended magnitude is supplied to the load Vload, the protection circuit 23 protects the load Vload by inhibiting an occurrence of a failure due to the supply of the voltage or the current to the load Vload. For example, the protection circuit 23 may include a switching device that forms a short circuit between terminals of the power receiving coil L2. The protection circuit 23 switches the state of the switching device between on and off in accordance with a drive signal from the control circuit 24. The wireless power receiving device 20 may be configured not to include the protection circuit 23.

The control circuit 24 controls the wireless power receiving device 20. The control circuit 24 transmits/receives various kinds of information to/from the wireless power transmission device 10 by controlling the power receiving-side communication unit 25. For example, the control circuit 24 transmits the power information described above to the wireless power transmission device 10 using the power receiving-side communication unit 25.

In addition, in a case in which the state of the wireless power receiving device 20 becomes a state having a possibility of a voltage or a current of an unintended magnitude being supplied to the load Vload, the control circuit 24 outputs a drive signal to the protection circuit 23 and protects the load Vload.

The power receiving-side communication unit 25, for example, is a communication circuit (or a communication device) performing wireless communication according to a communication standard such as Wi-Fi (a registered trademark). The power receiving-side communication unit 25 transmits/receives various kinds of information to/from the wireless power transmission device 10 in accordance with a signal from the control circuit 24.

<Configuration of Magnetic Body>

Hereinafter, the configuration of each of the magnetic body 13M included in the power transmission coil unit 13 and the magnetic body 21M included in the power receiving coil unit 21 will be described with reference to FIGS. 2 and 3.

Hereinafter, a case in which the configuration of the power transmission coil unit 13 is the same as the configuration of the power receiving coil unit 21 will be described as an example. In this case, the configuration of the magnetic body 13M is the same as the configuration of the magnetic body 21M. In addition, the configuration of the power transmission coil L1 is the same as the configuration of the power receiving coil L2. Thus, hereinafter, unless there is need to distinguish the power transmission coil unit 13 and the power receiving coil unit 21 from each other, they will be collectively referred to as a coil unit CU. Hereinafter, unless there is need to distinguish the magnetic body 13M and the magnetic body 21M from each other, they will be collectively referred to as a magnetic body M. Hereinafter, unless there is need to distinguish the power transmission coil L1 and the power receiving coil L2 from each other, they will be collectively referred to as a coil L. The configuration of the magnetic body 13M may be a configuration different from the configuration of the magnetic body 21M. The configuration of the power transmission coil L1 may be a configuration different from the configuration of the power receiving coil L2.

Figure 2:
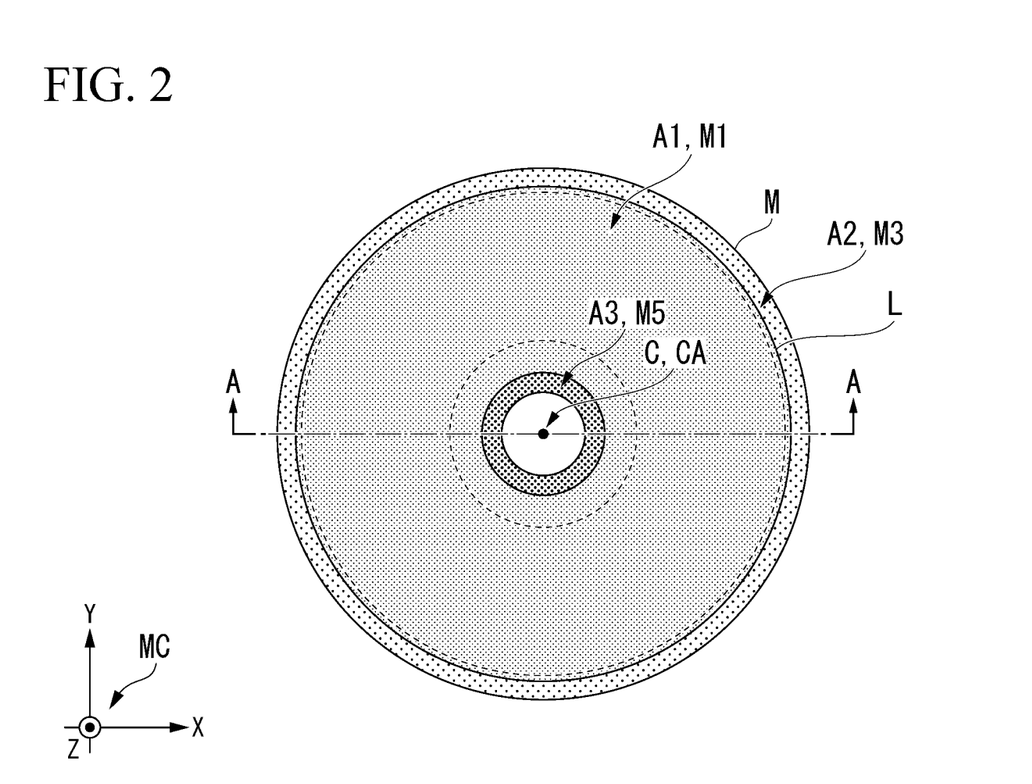
FIG. 2 is a top view illustrating an example of a magnetic body M in which a coil L is disposed.

FIG. 2 is a top view illustrating an example of a magnetic body M in which a coil L is disposed. FIG. 3 is a cross-sectional view in a case in which the coil L and the magnetic body M illustrated in FIG. 2 are cut along a line A illustrated in FIG. 2. Here, a three-dimensional coordinate system MC illustrated in FIGS. 2 and 3 represents directions in FIGS. 2 and 3.

The magnetic body M overlaps the coil L in a first direction. In other words, the first direction is a direction in which the magnetic body M and the coil L overlap each other. The first direction may be any direction in which the magnetic body M and the coil L overlap each other. In the example illustrated in FIGS. 2 and 3, the first direction coincides with a Z-axis direction in the three-dimensional coordinate system MC. In other words, in this example, the magnetic body M overlaps the coil L in the Z-axis direction in the three-dimensional coordinate system MC. In this example, the line A described above is a line that passes through the center C of the coil L and is parallel to an X axis in the three-dimensional coordinate system MC in FIG. 2.

First, the coil L disposed above the magnetic body M will be described.

Figure 3:
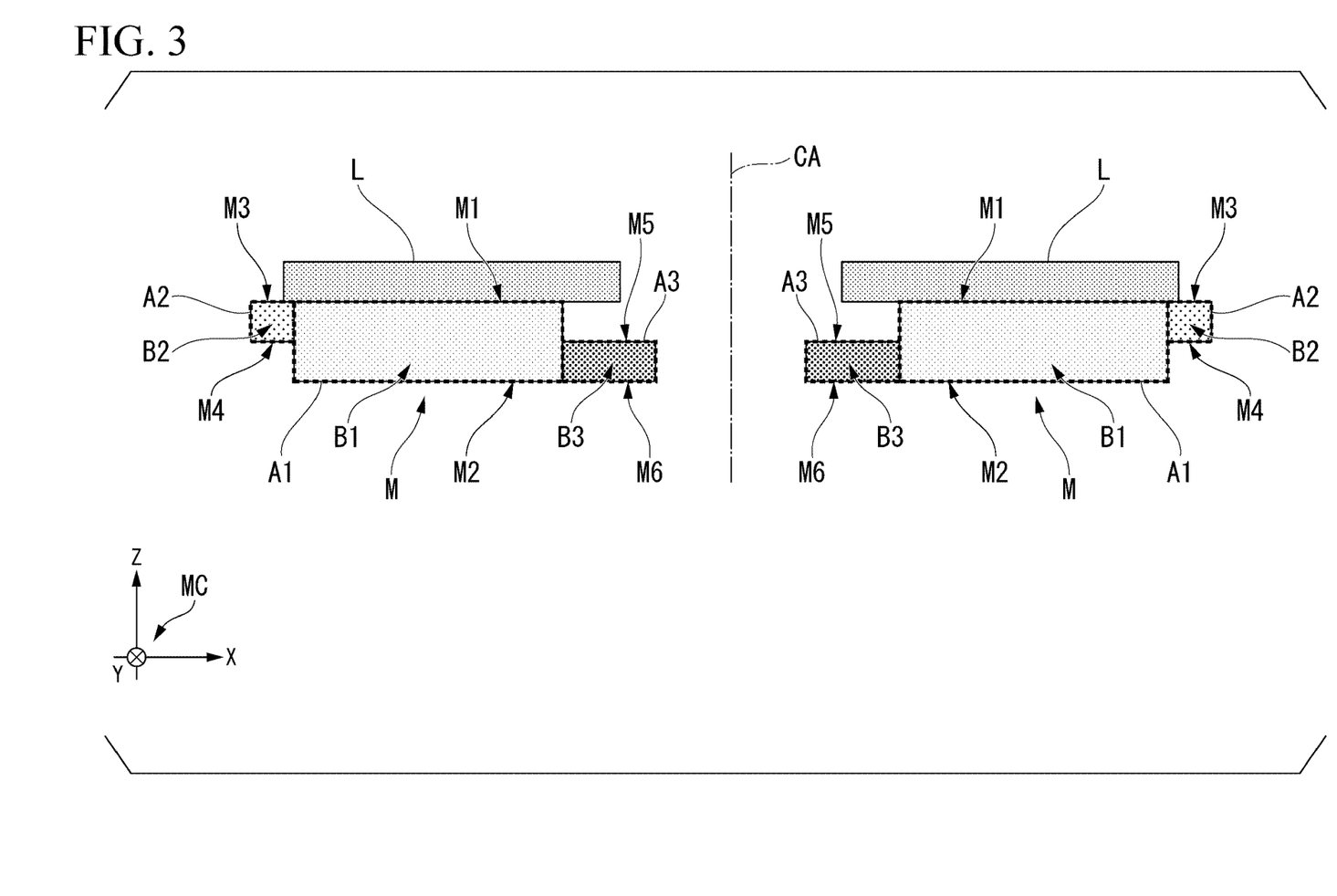
FIG. 3 is a cross-sectional view in a case in which the coil L and the magnetic body M illustrated in FIG. 2 are cut along a line A illustrated in FIG. 2.

In FIGS. 2 and 3, an area that is shaded as the coil L is an area in which conductors are winding as the coil L such that a distance between the conductors is equal to or shorter than a distance determined in advance.

The coil L made of the conductors are disposed in a spiral pattern has an opening in which the center of the spiral formed by the conductors installed as the coil L is enclosed by an inner edge of the spiral. In the example illustrated in FIGS. 2 and 3, the shape of the inner edge of the coil L (that is, the shape of the opening included in the coil L) is an approximately circular shape. Here, in this embodiment, the shape being an approximately circular shape represents the shape of the inner edge being able to be recognized as a circular shape even when the shape of the inner edge is distorted due to manufacturing error or the like. The shape of the inner edge of the coil L can be rephrased as a shape of the contour of an area enclosed by the conductors winding as the coil L. In other words, the shape of the contour is an approximately circular shape. The shape of the inner edge of the coil L may be any other shape such as a polygonal shape instead of an approximately circular shape.

The center C of the coil L described above represents the center of the inner edge of the coil L in which conductors are winding in a spiral pattern such that the shape of the inner edge becomes an approximately circular shape in this way when the coil L is seen in the first direction (the Z-axis direction in the three-dimensional coordinate system MC in FIGS. 2 and 3). In addition, the center axis CA of the coil L illustrated in FIGS. 2 and 3 represents an axis that passes through the center C of the coil L and is parallel to the Z axis in the three-dimensional coordinate system MC. In addition, in a case in which the shape of the inner edge of the coil L is a shape other than a circular shape, for example, the center C of the coil L represents a different position determined in accordance with the shape such as the centroid of the shape of the contour of the area enclosed by conductors wound as the coil L.

In the example illustrated in FIGS. 2 and 3, the shape of an outer edge of the coil L is an approximately circular shape. The shape of the outer edge of the coil L may be any other shape such as a polygonal shape instead of an approximately circular shape. In this example, although the shape of the outer edge of the coil L is the same as a shape of the inner edge of the coil L, it may be a shape different from the shape of the inner edge of the coil L instead of this.

In the example illustrated in FIGS. 2 and 3, in order to prevent the drawings from being complicated, conductors drawn from the coil L are omitted.

Next, the configuration of the magnetic body M will be described. As illustrated in FIGS. 2 and 3, the magnetic body M includes a first area A1, a second area A2, and a third area A3.

In the area included in the magnetic body M, the first area A1 is an area including a part overlapping the conductors winding as the coil L (an area shaded as the coil L in FIGS. 2 and 3) in the first direction (the Z-axis direction in the three-dimensional coordinate system MC in FIGS. 2 and 3).

The first area A1 includes a first face M1 and a second face M2.

The first face M1 is a face that overlaps the second face M2 in the first direction. In addition, the first face M1 is a face that is closer to the coil L than the second face M2 in the first direction.

The second area A2 is an area positioned at a position farther from the center C of the coil L than the first area A1 in a direction from the center C of the coil L toward the outer peripheral side (in other words, the outer edge side) of the coil L.

The second area A2 includes a third face M3 and a fourth face M4.

The third face M3 is a face that overlaps the fourth face M4 in the first direction. In addition, the third face M3 is a face that is closer to the coil L than the fourth face M4 in the first direction.

The third area A3 is an area positioned at a position closer to the center C of the coil L than the first area A1 in a direction from the center C of the coil L toward the outer peripheral side (in other words, an outer edge side) of the coil L.

The third area A3 includes a fifth face M5 and a sixth face M6.

The fifth face M5 is a face that overlaps the sixth face M6 in the first direction. In addition, the fifth face M5 is a face that is closer to the coil L than the sixth face M6 in the first direction.

Here, the magnetic body M may be configured to include a plurality of magnetic body pieces or may be configured by one magnetic body piece. Hereinafter, a case in which the magnetic body M includes three magnetic body pieces will be described as an example. In the example illustrated in FIGS. 2 and 3, the magnetic body M includes three magnetic body pieces of a first magnetic body piece B1 included in the first area A1, a second magnetic body piece B2 included in the second area A2, and a third magnetic body piece B3 included in the third area A3. In other words, in this example, the magnetic body M is composed of the three magnetic body pieces. In this case, in the coil unit CU, a magnetic body piece can be manufactured for each of areas (in other words, each of the first area A1 to the third area A3) included in the magnetic body M, and the manufacturing process of the magnetic body M can be simplified.

Each of the first magnetic body piece B1 to the third magnetic body piece B3, for example, may be configured to be assembled to form the shape of the magnetic body M by being pressed using a pressing force from the outside or may be configured to be assembled to form the shape of the magnetic body M using a certain method (for example, bonding using an adhesive material or the like). Between the first magnetic body piece B1 and the second magnetic body piece B2, a configuration in which a dielectric is disposed may be employed, a configuration in which no object is disposed, and a gap generated in a manufacturing process is present may be employed, or a configuration in which no object is disposed, and a gap generated in a manufacturing process is not present may be employed. In addition, between the first magnetic body piece B1 and the third magnetic body piece B3, a configuration in which a dielectric is disposed may be employed, a configuration in which no object is disposed, and a gap generated in a manufacturing process is present may be employed, or a configuration in which no object is disposed, and a gap generated in a manufacturing process is not present may be employed.

In this way, in a case in which the magnetic body M includes a plurality of magnetic body pieces, the coil unit CU can inhibit occurrence of distortion when the magnetic body M is manufactured (hardened through baking). As a result, the coil unit CU can inhibit occurrence of individual differences at the time of mass production.

Each of the first magnetic body piece B1 to the third magnetic body piece B3 may be configured either by a plurality of magnetic body pieces or by one magnetic body piece. In addition, the first magnetic body piece B1 and the second magnetic body piece B2 may be configured by one magnetic body piece. The first magnetic body piece B1 and the third magnetic body piece B3 may be configured by one magnetic body piece.

Hereinafter, for the convenience of description, a distance between the fifth face M5 and the coil L among distances in the first direction will be referred to as a first distance X1 in description. Hereinafter, for the convenience of description, a distance between the second face M2 and the coil L among distances in the first direction will be referred to as a second distance X2 in description. Hereinafter, for the convenience of description, a distance between the first face M1 and the coil L among distances in the first direction will be referred to as a third distance X3 in description. Hereinafter, for the convenience of description, a distance between the third face M3 and the coil L among distances in the first direction will be referred to as a fourth distance X4 in description. Hereinafter, for the convenience of description, a distance between the fourth face M4 and the coil L among distances in the first direction will be referred to as a fifth distance X5 in description.

Figure 4:
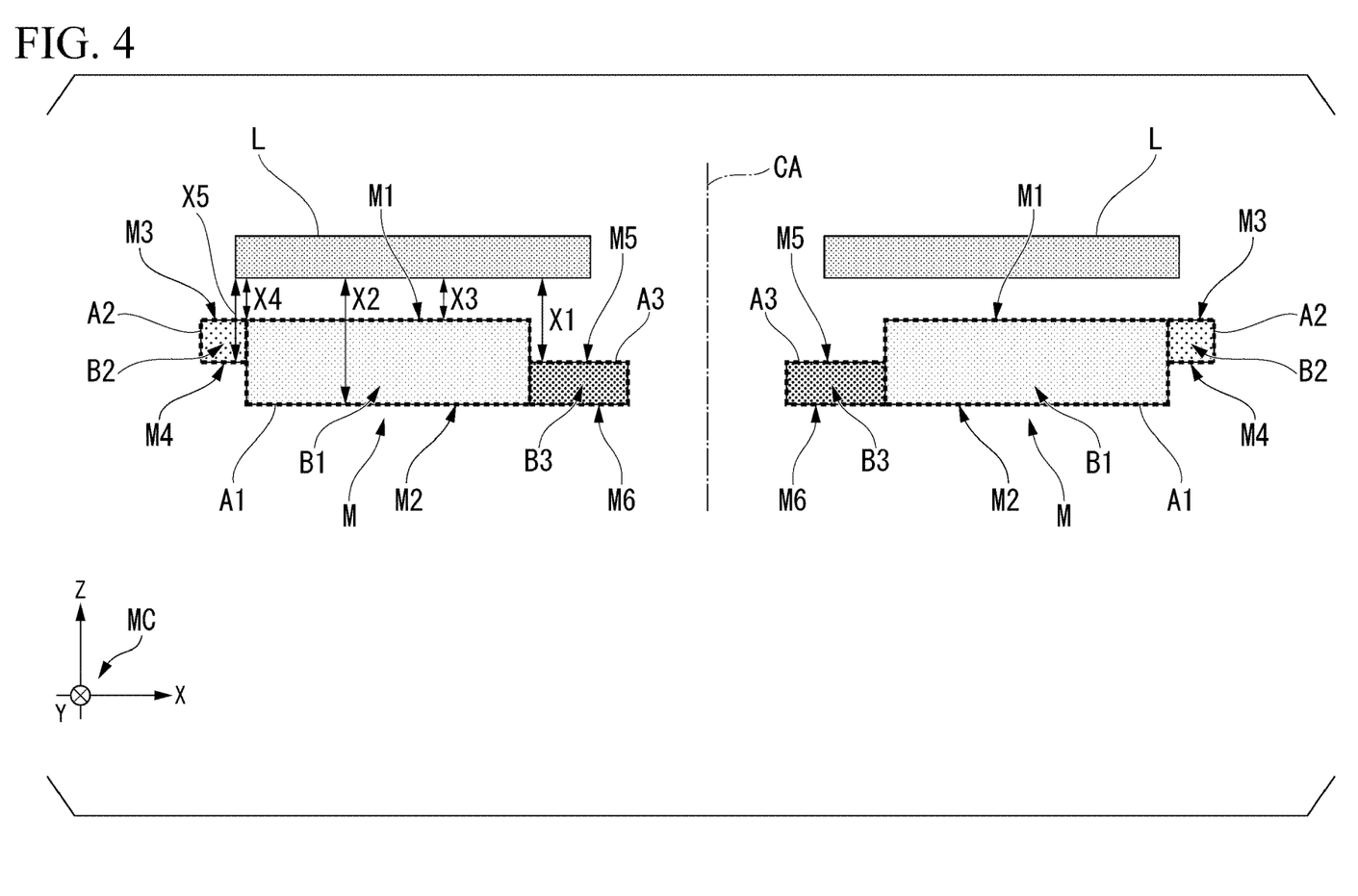
FIG. 4 is a diagram for clearly illustrating a first distance X1 to a fifth distance X5 in the magnetic body M illustrated in FIG. 3.

FIG. 4 is a diagram for clearly illustrating the first distance X1 to the fifth distance X5 in the magnetic body M illustrated in FIG. 3. In FIG. 4, in order to clearly illustrate the first distance X1 to the fifth distance X5, a coil L and the magnetic body M are drawn to be separate away from each other.

As illustrated in FIG. 4, the first distance X1 is shorter than the second distance X2. The first distance X1 is longer than the third distance X3. The fourth distance X4 is shorter than the first distance X1. The fifth distance X5 is longer than the third distance X3.

Figure 5:
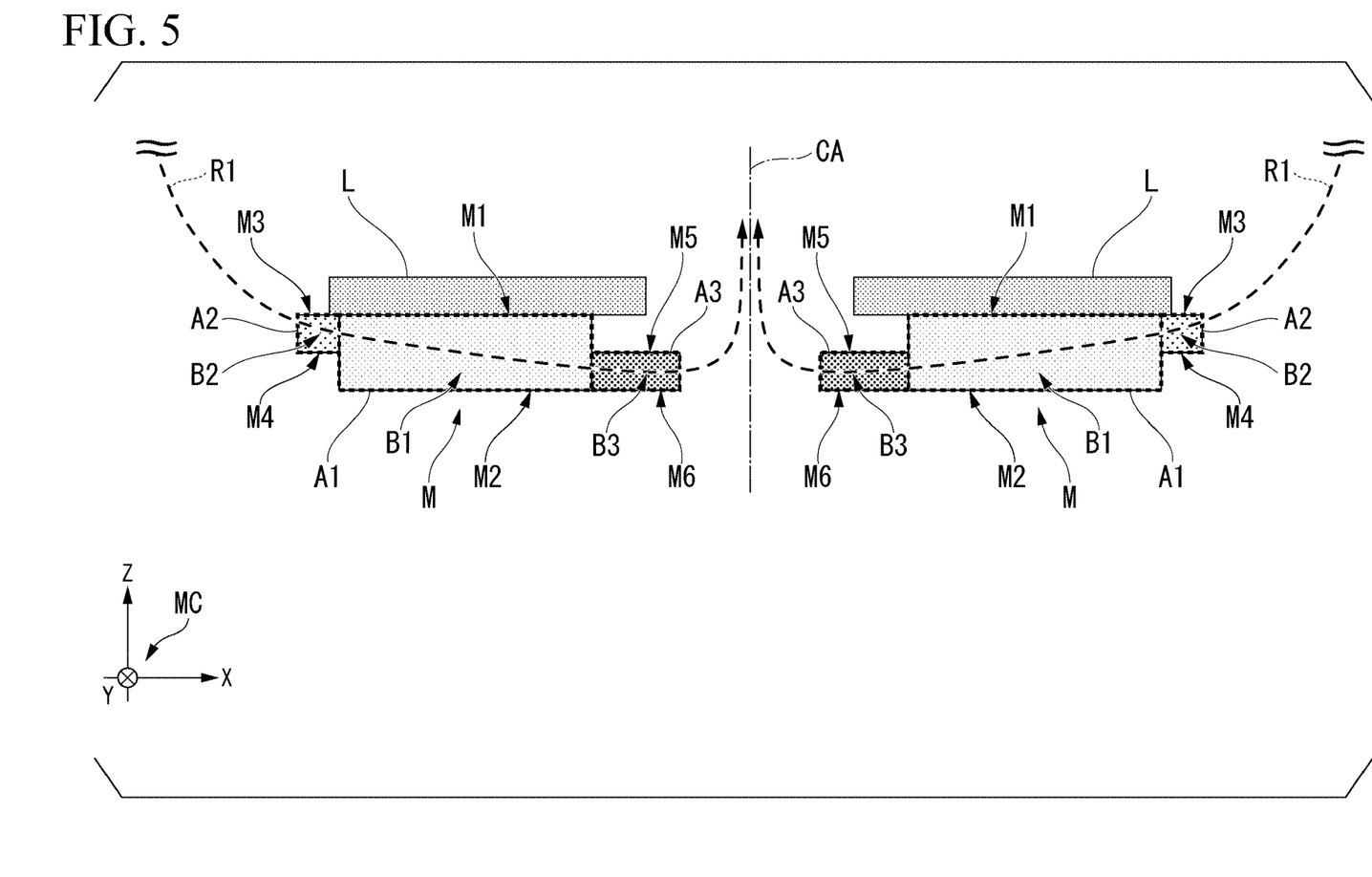
FIG. 5 is a diagram illustrating an example of a path of magnetic flux passing through the inside of the magnetic body M illustrated in FIG. 3.

Since the magnetic body M has such a configuration, a path of magnetic flux passing through the inside of the magnetic body M at the time of wireless power transmission is a path that is further away from the coil L in the first direction as it further approaches the center axis CA of the coil L from the outer edge side of the coil L. FIG. 5 is a diagram illustrating an example of a path of magnetic flux passing through the inside of the magnetic body M illustrated in FIG. 3. A path R1 illustrated in FIG. 5 represents one example of a path of magnetic flux passing through the inside of the magnetic body M illustrated in FIG. 3 at the time of wireless power transmission.

As illustrated in FIG. 5, since the magnetic flux passes through the inside of the magnetic body M at the time of wireless power transmission, for example, in the power transmission coil unit 13 including the magnetic body 13M, a circulation path of the magnetic flux changes in accordance with the magnetic body 13M, and a magnetic flux density of the wireless power transmission face side of the power transmission coil L1 can be decreased. As a result, the power transmission coil unit 13 can inhibit heat generation occurring in a case in which a foreign material such as a metal is interposed on the surface of the power transmission coil unit 13. In the magnetic flux of the wireless power transmission face side of the power transmission coil L1, both magnetic flux contributing to wireless power transmission and magnetic flux not contributing to wireless power transmission are included.

Here, the wireless power transmission face of the coil L is a face on a side opposite to a face on which the magnetic body M is disposed among faces of the coil L. For example, the wireless power transmission face of the power transmission coil L1 is a face on a side that is close to the power receiving coil L2 (a face facing the power receiving coil L2) among the faces of the power transmission coil L1 at the time of wireless power transmission. For example, the wireless power transmission face of the power receiving coil L2 is a face on a side that is close to the power transmission coil L1 (a face facing the power transmission coil L1) among faces of the power receiving coil L2 at the time of wireless power transmission.

In addition, since magnetic flux passes through the inside of the magnetic body M at the time of wireless power transmission, for example, in the power receiving coil unit 21 including the magnetic body 21M, a circulation path of the magnetic flux changes in accordance with the magnetic body 21M, and the magnetic flux density of the wireless power transmission face side of the power receiving coil L2 can be decreased. As a result, the power receiving coil unit 21 can inhibit heat generation occurring in a case in which a foreign material such as a metal is interposed on the surface of the power receiving coil unit 21. In the magnetic flux of the wireless power transmission face side of the power receiving coil L2, both magnetic flux contributing to wireless power transmission and magnetic flux not contributing to wireless power transmission are included.

Since the magnetic body M has such a configuration, a thickness of the second area A2 of the magnetic body M in the first direction can be configured to be smaller than a thickness of the first area A1 in the first direction. As a result, the coil unit CU can reduce the amount of use of the magnetic body.

In addition, since the magnetic body M has such a configuration, the magnetic flux passing through the inside of the magnetic body M is not concentrated in a shortest path among paths in which the magnetic flux passes through the inside of the first area A1. The reason for this is that magnetic resistance is lower inside the third area A3 than in the air. More specifically, magnetic flux passing through the inside of the magnetic body M has a path having low magnetic resistance. For this reason, the magnetic flux passes through the first area A1 from the second area A2 and passes through the third area A3 from the first area A1. As a result, the magnetic flux passing through the first area A1 is directed toward the third area A3 from the second area A2 and is directed toward the second face M2 from the first face M1 of the first area A1. As a result, the coil unit CU can inhibit the magnetic body M from reaching an overheated state.

The description will be continued with reference to FIG. 4. In the example illustrated in FIG. 4, the fifth distance X5 is shorter than the second distance X2. In this case, the coil unit CU can reduce the amount of use of the magnetic body more reliably. Also in this case, in the coil unit CU, magnetic flux passing through the inside of the magnetic body M is not concentrated in a shortest path among paths in which magnetic flux passes through the inside of the first area A1. In other words, also in this case, the coil unit CU can inhibit the magnetic body M from reaching an overheated state. In a case in which an increase in the amount of use of the magnetic body M is allowed, the fifth distance X5 may be a distance that is equal to or longer than the second distance X2. In addition, the fifth distance X5 may be a distance that is equal to or shorter than the first distance X1. In this case, the coil unit CU can reduce the amount of use of the magnetic body more than in a case in which the fifth distance X5 is shorter than the second distance X2, and the fifth distance X5 is longer than the first distance X1.

In the example illustrated in FIG. 4, the second face M2 is substantially included in a face including the sixth face M6. Here, in this embodiment, a certain face being substantially included in another face means that, even in a case in which the certain face is not included in the another face due to manufacturing error of the certain face, the certain face is regarded to be included in the another face. In a case in which the second face M2 is not included in a face including the sixth face M6, magnetic resistance near a step difference between the second face M2 and the sixth face M6 increases. In other words, by causing the second face M2 to be substantially included in a face including the sixth face M6, the coil unit CU can inhibit an increase in such magnetic resistance. As a result, the coil unit CU can reduce heat generation according to the magnetic flux of the magnetic body M. In a case in which an increase in such magnetic resistance is allowed, the second face M2 may be configured not to be included in a face including the sixth face M6.

As illustrated in FIGS. 1 to 4, the first area A1 does not overlap an area disposed above the inner side of the inner edge of the coil L in the first direction. In accordance with this, in the coil unit CU, passage of magnetic flux from the first area A1 to the area without passing through the third area A3 can be inhibited. As a result, the coil unit CU can reduce the magnetic flux density of the wireless power transmission face side of the coil L.

As described above, a coil unit according to an embodiment (in the example described above, the power transmission coil unit 13, the power receiving coil unit 21, and the coil unit CU) includes a magnetic body (in the example described above, the magnetic body 13M, the magnetic body 21M, and the magnetic body M) and a coil (in the example described above, the power transmission coil L1, the power receiving coil L2, and the coil L) made of a conductor in a spiral state disposed above the magnetic body. An opening is formed in the coil, and the magnetic body overlaps the coil in a first direction (in the example described above, the Z-axis direction in the three-dimensional coordinate system MC) and includes a first area (in the example described above, the first area A1) including a part overlapping the conductor in the first direction, a second area (in the example described above, the second area A2) positioned at a position farther from the center of the coil than the first area in a direction from the center of the coil toward the outer periphery side of the coil, and a third area (in the example described above, the third area A3) positioned at a position closer to the center of the coil than the first area in a direction from the center of the coil toward the outer periphery side of the coil. The first area includes a first face (in the example described above, the first face M1) and a second face (in the example described above, the second face M2). The first face is a face that overlaps the second face in the first direction and is closer to the coil than the second face in the first direction. The second area includes a third face (in the example described above, the third face M3) and a fourth face (the fourth face M4). The third face is a face that overlaps the fourth face in the first direction and is closer to the coil than the fourth face in the first direction. The third area includes a fifth face (in the example described above, the fifth face M5) and a sixth face (in the example described above, the sixth face M6). The fifth face is a face that overlaps the sixth face in the first direction and is closer to the coil than the sixth face in the first direction. A first distance (in the example described above, the first distance X1) between the fifth face and the coil among distances in the first direction is shorter than a second distance (in the example described above, the second distance X2) between the second face and the coil among the distances in the first direction and is longer than a third distance (in the example described above, the third distance X3) between the first face and the coil among the distances in the first direction, a fourth distance (in the example described above, the fourth distance X4) between the third face and the coil among the distances in the first direction is shorter than the first distance, and a fifth distance (in the example described above, the fifth distance X5) between the fourth face and the coil among the distances in the first direction is longer than the third distance. In accordance with this, the coil unit can inhibit the magnetic body from reaching an overheated state while the amount of the magnetic body used is reduced.

In addition, in the coil unit, a configuration in which the fifth distance is shorter than the second distance may be used. In such a case, the coil unit can reduce the amount of use of the magnetic body more reliably.

In addition, in the coil unit, a configuration in which the fifth distance is equal to or shorter than the first distance may be used. In such a case, the coil unit can reduce the amount of use of the magnetic body more than in a case in which the fifth distance is shorter than the second distance, and the fifth distance is longer than the first distance.

In addition, in the coil unit, a configuration in which the first area does not overlap an area disposed above the inner side of the inner edge of the coil in the first direction may be used. In such a case, the coil unit can reduce the magnetic flux density of the wireless power transmission face side of the coil (a face side on a side on which the magnetic body is not disposed among faces of the coil) by changing a circulation path of the magnetic flux in accordance with the magnetic body.

In addition, in the coil unit, a configuration in which the magnetic body includes a plurality of magnetic body pieces (in the example described above, the first magnetic body piece B1, the second magnetic body piece B2, and the third magnetic body piece B3) may be used. In such a case, the coil units can inhibit occurrence of individual differences at the time of mass production.

In addition, in the coil unit, a configuration in which three magnetic body pieces of a first magnetic body piece (in the example described above, the first magnetic body piece B1), a second magnetic body piece (in the example described above, the second magnetic body piece B2), and a third magnetic body piece (in the example described above, the third magnetic body piece B3) are included in the plurality of magnetic body pieces, the first magnetic body piece is included in the first area, the second magnetic body piece is included in the second area, and the third magnetic body piece is included in the third area may be used. In such a case, in the coil unit, a magnetic body piece can be manufactured for each area of the magnetic body, and the manufacturing process of the magnetic body can be simplified.

In addition, in the coil unit, a configuration in which the second face is substantially included in a face including the sixth face may be used. In such a case, the coil unit can reduce heat generation according to the magnetic flux of the magnetic body.

Modified Example 1 of Embodiment

Hereinafter, Modified example 1 of the embodiment will be described with reference to FIG. 6. In Modified example 1 of the embodiment, the same reference signs will be assigned to the same components as those of the embodiment, and description thereof will be omitted.

In Modified example 1 of the embodiment, a coil unit CU includes a magnetic body MA instead of the magnetic body M.

The magnetic body MA includes two magnetic body pieces of a fourth magnetic body piece B4 and a fifth magnetic body piece B5 instead of the configuration including three magnetic body pieces of the first magnetic body piece B1 to the third magnetic body piece B3. The shape of the magnetic body MA has the same shape as the shape of the magnetic body M. The configuration of the magnetic body MA has the same configuration as the configuration of the magnetic body M other than inclusion of two magnetic body pieces of the fourth magnetic body piece B4 and the fifth magnetic body piece B5. For example, the magnetic body MA, similar to the magnetic body M, includes three areas of a first area A1 to a third area A3.

Figure 6:
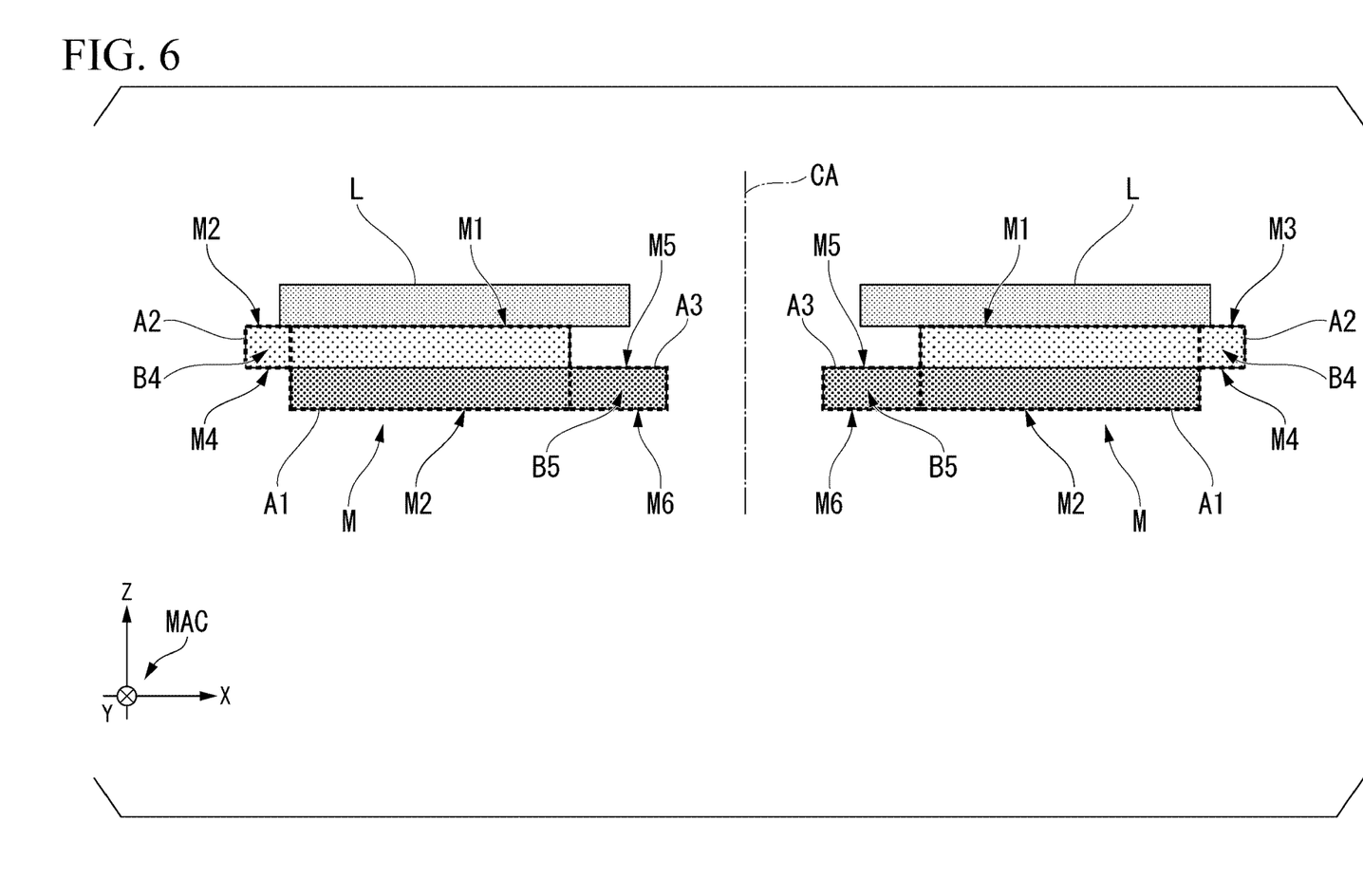
FIG. 6 is a diagram illustrating an example of a magnetic body MA according to Modified example 1 of the embodiment.

FIG. 6 is a diagram illustrating an example of the magnetic body MA according to Modified example 1 of the embodiment. FIG. 6 is a cross-sectional view of a case in which the magnetic body MA is cut along a line that passes through the center C of the coil L and is parallel to an X axis in a three-dimensional coordinate system MAC. Here, the three-dimensional coordinate system MAC illustrated in FIG. 6 represents directions in FIG. 6. As illustrated in FIG. 6, a method of overlapping the magnetic body MA and the coil L is the same as the method of overlapping the magnetic body M and the coil L. In other words, in Modified example 1 of the embodiment, a first direction is a direction in which the magnetic body MA and the coil L overlap each other. The first direction in the example illustrated in FIG. 6 coincides with the Z-axis direction in the three-dimensional coordinate system MAC.

As illustrated in FIG. 6, the fourth magnetic body piece B4 is included over a part of the first area A1 that is positioned on the coil L side and the second area A2. For example, the fourth magnetic body piece B4 is a magnetic body piece of which a thickness in the first direction is the same as a thickness of the second area A2 in the first direction. In addition, the fourth magnetic body piece B4 is a plate-shaped magnetic body piece extending on an XY plane over the second area A2 to the first area A1. The XY plane is an XY plane that extends using the X axis in the three-dimensional coordinate system MAC and the Y axis in the three-dimensional coordinate system MAC. The shape of the fourth magnetic body piece B4 may be any other shape instead of a plate shape.

As illustrated in FIG. 6, the fifth magnetic body piece B5 is included over a part positioned on a side opposite to the coil L of the first area A1 and the third area A3. For example, the fifth magnetic body piece B5 is a magnetic body piece of which a thickness in the first direction is the same as a thickness of the third area A3 in the first direction. In addition, the fifth magnetic body piece B5 is a plate-shaped magnetic body piece extending from the third area A3 to the first area A1 on the XY plane. The XY plane is an XY plane that extends using the X axis in the three-dimensional coordinate system MAC and the Y axis in the three-dimensional coordinate system MAC. The shape of the fifth magnetic body piece B5 may be any other shape instead of a plate shape.

Since the magnetic body MA has such a configuration, in the coil unit CU, the magnetic body MA can be manufactured by superimposing two plate-shaped magnetic body pieces, and accordingly, the manufacturing process of the magnetic body can be simplified.

As described above, in the coil unit according to Modified example 1 of the embodiment (in Modified example 1 of the embodiment, the power transmission coil unit 13, the power receiving coil unit 21, and the coil unit CU), a configuration in which two magnetic body pieces of a fourth magnetic body piece (in Modified example 1 of the embodiment, the fourth magnetic body piece B4) and a fifth magnetic body piece (in Modified example 1 of the embodiment, the fifth magnetic body piece B5) are included in a plurality of magnetic body pieces, the fourth magnetic body piece is included over a part positioned on the coil (in Modified example 1 of the embodiment, the power transmission coil L1, the power receiving coil L2, and the coil L) side of a first area (in Modified example 1 of the embodiment, the first area A1) and a second area (in Modified example 1 of the embodiment, the second area A2), and the fifth magnetic body piece is included over a part positioned on a side opposite to the coil of the first area and a third area (in Modified example 1 of the embodiment, the third area A3) may be used. In accordance with this, in the coil unit, the magnetic body can be manufactured using two magnetic body pieces, and the manufacturing process of the magnetic body can be simplified.

Modified Example 2 of Embodiment

Hereinafter, Modified example 2 of the embodiment will be described. In Modified example 2 of the embodiment, the same reference signs will be assigned to the same component as those of the embodiment, and description thereof will be omitted.

In the embodiment, the coil L of the coil unit CU has rotation symmetry with respect to rotation of an arbitrary rotation angle around the center axis CA. In addition, in the embodiment, the magnetic body M in which the coil L is disposed has rotation symmetry with respect to rotation of an arbitrary rotation angle around the center axis CA as well. However, at least one of the coil L and the magnetic body M does not need to have such rotation symmetry. In Modified example 2 of the embodiment, the coil unit L and the magnetic body M of the coil unit CU do not have rotation symmetry with respect to rotation of an arbitrary rotation angle around the center axis CA.

Figure 7:
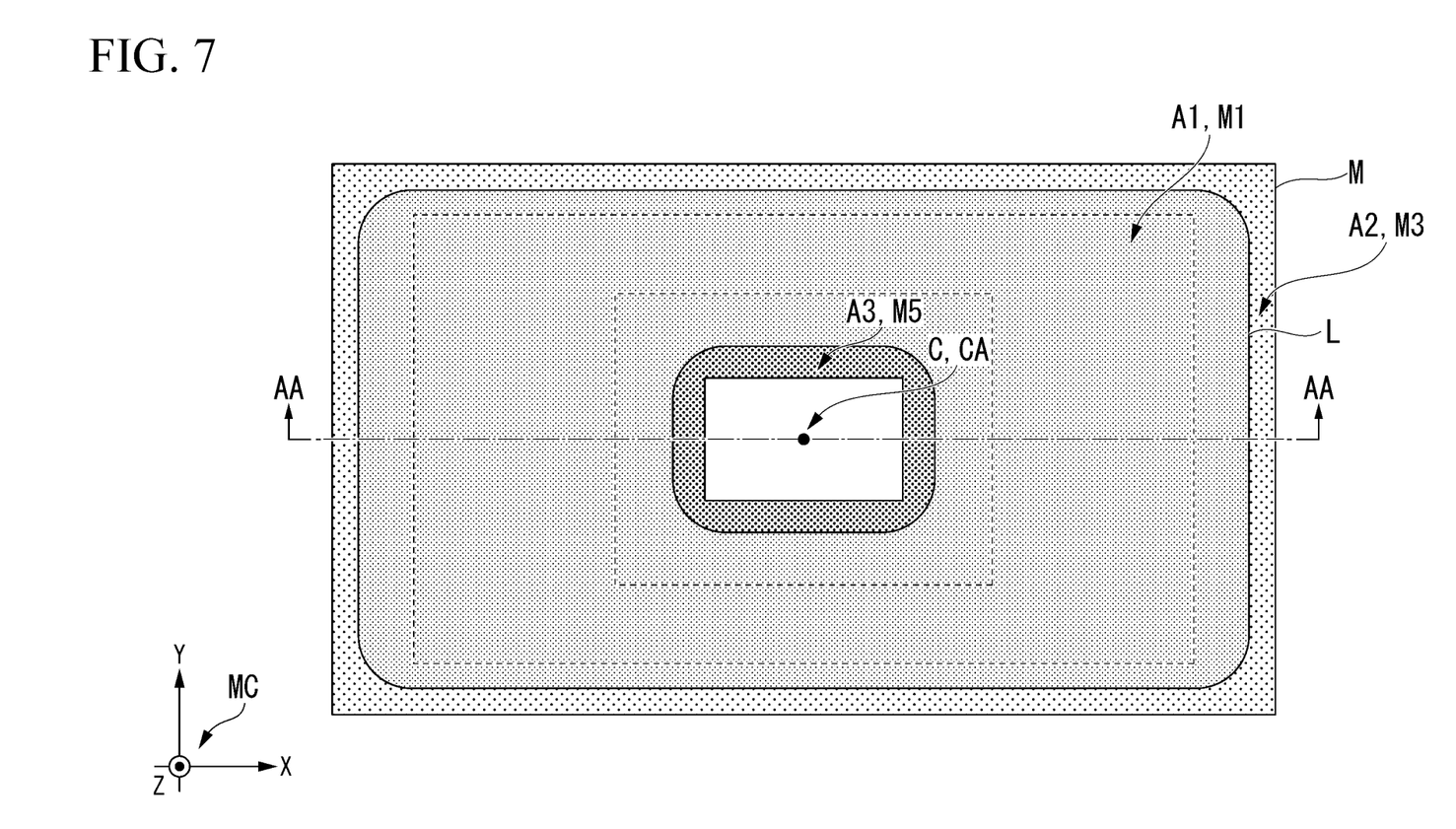
FIG. 7 is a top view illustrating an example of a magnetic body M according to Modified example 2 of the embodiment.
Figure 8:
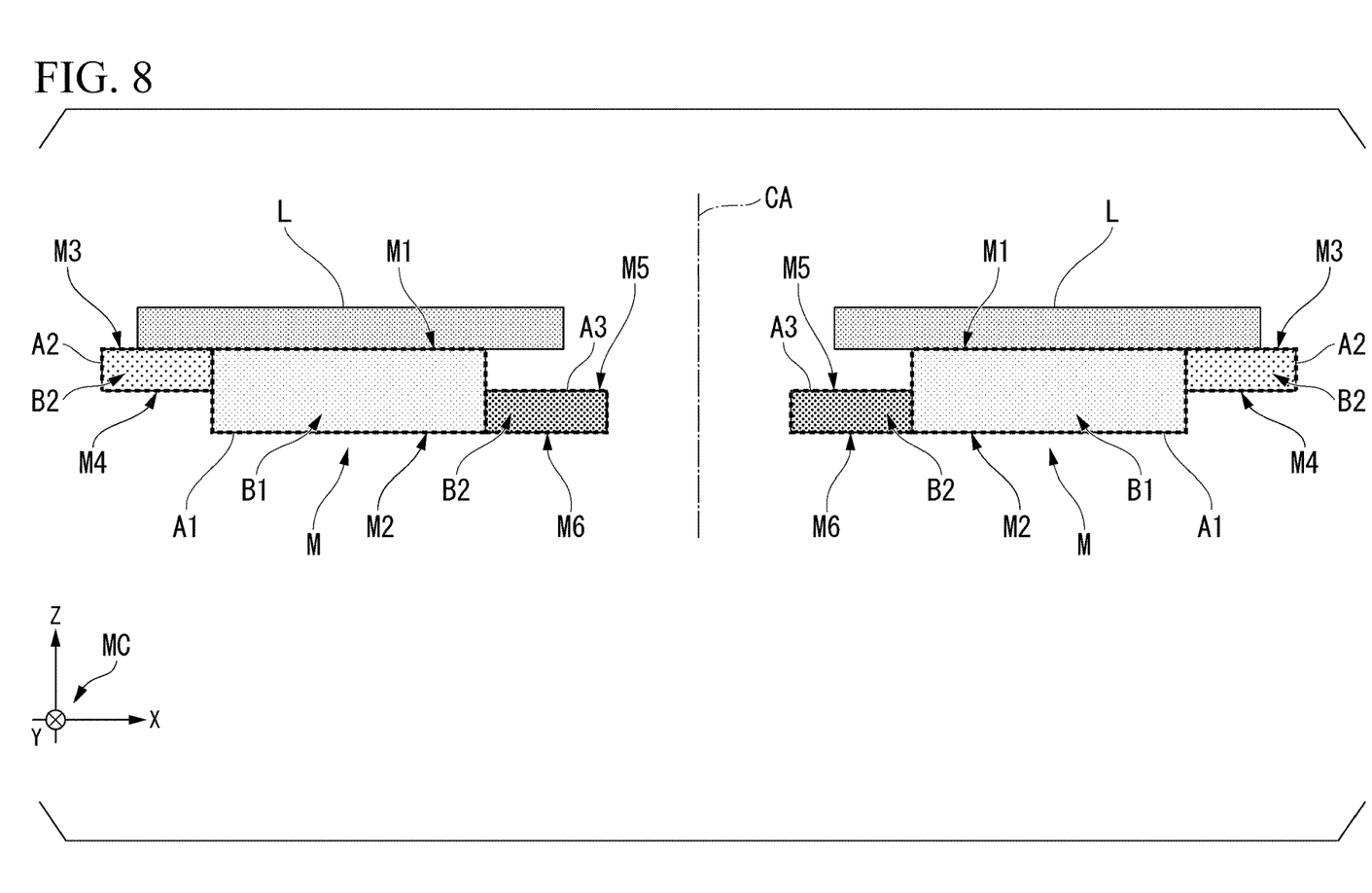
FIG. 8 is a cross-sectional view in a case in which a coil L and the magnetic body M illustrated in FIG. 7 are cut along a line AA illustrated in FIG. 7.

FIG. 7 is a top view illustrating an example of a magnetic body 13M according to Modified example 2 of the embodiment. On the magnetic body M illustrated in FIG. 7, a coil L according to Modified example 2 of the embodiment is disposed. FIG. 8 is a cross-sectional view in a case in which the coil L and the magnetic body M illustrated in FIG. 7 are cut along a line AA illustrated in FIG. 7. Here, a three-dimensional coordinate system MC illustrated in FIGS. 7 and 8 represents directions in FIGS. 7 and 8.

As illustrated in FIGS. 7 and 8, the configuration of the coil L according to Modified example 2 of the embodiment has the same configuration as the configuration of the coil L according to the embodiment except for a different shape. For this reason, the characteristics of the coil L according to Modified example 2 of the embodiment are the same as the characteristics of the coil L according to the embodiment. In addition, as illustrated in FIGS. 7 and 8, the configuration of the magnetic body M according to Modified example 2 of the embodiment is the same as the configuration of the magnetic body M according to the embodiment except for a different shape. For this reason, the characteristics of the magnetic body M according to Modified example 2 of the embodiment are the same as the characteristics of the magnetic body M according to the embodiment. A method of overlapping the coil L according to Modified example 2 of the embodiment and the magnetic body M according to Modified example 2 of the embodiment is the same as the method of overlapping the coil L according to the embodiment and the magnetic body M according to the embodiment.

Here, in Modified example 2 of the embodiment, since the shape of the inner edge of the coil L is not a circular shape, the center C of the coil L represents a drawing center of the shape of the contour of an area enclosed by a conductor winding as the coil L.

As described above, even in a case in which the coil L and the magnetic body M of the coil unit CU do not have rotation symmetry with respect to rotation of an arbitrary angle around the center axis CA, the coil unit CU according to Modified example 2 of the embodiment, similar to the coil unit CU according to the embodiment, can inhibit the magnetic body M from reaching an overheated state while the amount of the magnetic body M used is reduced.

Although the coil L illustrated in FIGS. 7 and 8 has rotation symmetry with respect to rotation of 180° around the center axis CA, the coil L may be configured not to have rotation symmetry with respect to any rotation angle around the center axis CA. In addition, the magnetic body M illustrated in FIGS. 7 and 8 has rotation symmetry with respect to rotation of 180° around the center axis CA, the magnetic body M may be configured not to have rotation symmetry with respect to any rotation angle around the center axis CA.

In addition, the level difference part formed by the first area A1 and the second area A2 described above may be rounded using any method or may be inclined using any method. In such a case, there is a small number of points through which it is difficult for the magnetic flux to pass inside the magnetic body M or the magnetic body MA. As a result, the coil unit CU can inhibit the magnetic body M or the magnetic body MA from reaching an overheated state more reliably.

In addition, the level difference part formed by the first area A1 and the third area A3 described above may be rounded using any method or may be inclined using any method. In such a case, there is a small number of points through which it is difficult for the magnetic flux to pass inside the magnetic body M or the magnetic body MA. As a result, the coil unit CU can inhibit the magnetic body M or the magnetic body MA from reaching an overheated state more reliably.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES 1 wireless power transmission system
10 wireless power transmission device
11 conversion circuit
12 power transmission circuit
13 power transmission coil unit
M, 13M, 13MA, 21M magnetic body
14 control circuit
15 transmission-side communication unit
20 wireless power receiving device
21 power receiving coil unit
22 rectification and smoothing circuit
23 protection circuit
24 control circuit
25 power receiving-side communication unit
A1 first area
A2 second area
A3 third area
B1 first magnetic body piece
B2 second magnetic body piece
B3 third magnetic body piece
B4 fourth magnetic body piece
B5 fifth magnetic body piece
CU coil unit
L coil
L1 power transmission coil
L2 power receiving coil
M1 first face
M2 second face
M3 third face
M4 fourth face
M5 fifth face
M6 sixth face
P commercial power supply
Vload load
X1 first distance
X2 second distance
X3 third distance
X4 fourth distance
X5 fifth distance

What is claimed is:

1. A coil unit comprising:
a magnetic body; and
a coil made of a conductor in a spiral pattern disposed above the magnetic body,
wherein an opening is formed in the coil,
wherein the magnetic body overlaps the coil in a first direction and includes a first area including a part overlapping the conductor in the first direction, a second area positioned at a position farther from a center of the coil than the first area in a direction from the center of the coil toward an outer periphery side of the coil, and a third area positioned at a position closer to the center of the coil than the first area in the direction from the center of the coil toward the outer periphery side of the coil,
wherein the first area includes a first face and a second face,
wherein the first face is a face that overlaps the second face in the first direction and is closer to the coil than the second face in the first direction,
wherein the second area includes a third face and a fourth face,
wherein the third face is a face that overlaps the fourth face in the first direction and is closer to the coil than the fourth face in the first direction,
wherein the third area includes a fifth face and a sixth face,
wherein the fifth face is a face that overlaps the sixth face in the first direction and is closer to the coil than the sixth face in the first direction,
wherein a first distance between the fifth face and the coil among distances in the first direction is shorter than a second distance between the second face and the coil among the distances in the first direction and is longer than a third distance between the first face and the coil among the distances in the first direction, and a fourth distance between the third face and the coil among the distances in the first direction is shorter than the first distance, and
wherein a fifth distance between the fourth face and the coil among the distances in the first direction is longer than the third distance.

2. The coil unit according to claim 1, wherein the fifth distance is shorter than the second distance.

3. The coil unit according to claim 2, wherein the fifth distance is a distance that is equal to or shorter than the first distance.

4. The coil unit according to claim 1, wherein the first area does not overlap an area on an inner side of an inner edge of the coil in the first direction.

5. The coil unit according to claim 2, wherein the first area does not overlap an area on an inner side of an inner edge of the coil in the first direction.

6. The coil unit according to claim 3, wherein the first area does not overlap an area on an inner side of an inner edge of the coil in the first direction.

7. The coil unit according to claim 1, wherein the magnetic body includes a plurality of magnetic body pieces.

8. The coil unit according to claim 2, wherein the magnetic body includes a plurality of magnetic body pieces.

9. The coil unit according to claim 3, wherein the magnetic body includes a plurality of magnetic body pieces.

10. The coil unit according to claim 7,
wherein three magnetic body pieces of a first magnetic body piece, a second magnetic body piece, and a third magnetic body piece are included in the plurality of magnetic body pieces,
wherein the first magnetic body piece is included in the first area,
wherein the second magnetic body piece is included in the second area, and
wherein the third magnetic body piece is included in the third area.

11. The coil unit according to claim 8,
wherein three magnetic body pieces of a first magnetic body piece, a second magnetic body piece, and a third magnetic body piece are included in the plurality of magnetic body pieces,
wherein the first magnetic body piece is included in the first area,
wherein the second magnetic body piece is included in the second area, and
wherein the third magnetic body piece is included in the third area.

12. The coil unit according to claim 9,
wherein three magnetic body pieces of a first magnetic body piece, a second magnetic body piece, and a third magnetic body piece are included in the plurality of magnetic body pieces,
wherein the first magnetic body piece is included in the first area,
wherein the second magnetic body piece is included in the second area, and
wherein the third magnetic body piece is included in the third area.

13. The coil unit according to claim 7,
wherein two magnetic body pieces of a fourth magnetic body piece and a fifth magnetic body piece are included in the plurality of magnetic body pieces,
wherein the fourth magnetic body piece is included over a part of the first area that is positioned on the coil side and the second area, and
wherein the fifth magnetic body piece is included over a part of the first area that is positioned on a side opposite to the coil and the third area.

14. The coil unit according to claim 8,
wherein two magnetic body pieces of a fourth magnetic body piece and a fifth magnetic body piece are included in the plurality of magnetic body pieces,
wherein the fourth magnetic body piece is included over a part of the first area that is positioned on the coil side and the second area, and
wherein the fifth magnetic body piece is included over a part of the first area that is positioned on a side opposite to the coil and the third area.

15. The coil unit according to claim 9,
wherein two magnetic body pieces of a fourth magnetic body piece and a fifth magnetic body piece are included in the plurality of magnetic body pieces,
wherein the fourth magnetic body piece is included over a part of the first area that is positioned on the coil side and the second area, and
wherein the fifth magnetic body piece is included over a part of the first area that is positioned on a side opposite to the coil and the third area.

16. The coil unit according to claim 1, wherein the second face substantially is included in a face including the sixth face.

17. The coil unit according to claim 2, wherein the second face is substantially included in a face including the sixth face.

18. The coil unit according to claim 3, wherein the second face is substantially included in a face including the sixth face.

19. A wireless power transmission device comprising the coil unit according to claim 1 as a power transmission coil unit.

20. A wireless power receiving device comprising the coil unit according to claim 1 as a power receiving coil unit.

21. A wireless power transmission system comprising at least one of the wireless power transmission device according to claim 19 and the wireless power receiving device comprising the coil unit as a power receiving coil unit.

* * * * *